United States Patent [19]
Baylor et al.

[11] Patent Number: 5,313,609
[45] Date of Patent: May 17, 1994

[54] OPTIMUM WRITE-BACK STRATEGY FOR DIRECTORY-BASED CACHE COHERENCE PROTOCOLS

[75] Inventors: Sandra J. Baylor, Mt. Kisco; Kevin P. McAuliffe, Peekskill; Bharat D. Rathi, Mahopac, all of N.Y.

[73] Assignee: International Business Machines Corporation, Armonk, N.Y.

[21] Appl. No.: 704,553

[22] Filed: May 23, 1991

[51] Int. Cl.$^5$ .............................................. G06F 12/00
[52] U.S. Cl. ............................ 395/425; 364/DIG. 1; 364/243.41
[58] Field of Search ....................................... 395/425

[56] References Cited

U.S. PATENT DOCUMENTS

| | | | |
|---|---|---|---|
| 4,426,681 | 1/1984 | Bacot et al. | 395/425 |
| 4,445,174 | 4/1984 | Fletcher | 395/425 |
| 4,471,429 | 9/1984 | Porter et al. | 395/400 |
| 4,484,267 | 11/1984 | Fletcher | 395/425 |
| 4,622,631 | 11/1986 | Frank et al. | 395/800 |
| 4,747,043 | 5/1988 | Rodman | 395/425 |
| 4,755,930 | 7/1988 | Wilson, Jr. et al. | 395/425 |
| 4,768,148 | 8/1988 | Keeley et al. | 395/425 |
| 4,785,395 | 11/1988 | Keeley | 395/425 |
| 4,847,804 | 7/1989 | Shaffer et al. | 395/425 |
| 5,119,485 | 6/1992 | Ledbetter, Jr. et al. | 395/425 |

OTHER PUBLICATIONS

E. V. Toney, "Compact Global Table For Management Of Multiple Caches," IBM Technical Disclosure Bulletin, vol. 32, No. 7, pp. 322–324, Dec., 1989.

C. K. Tang, "Cache system design in the tightly coupled multiprocessor system," National Computer Conference, pp. 749–753, Endicott, New York, 1976.

W. C. Yen, D. W. L. Yen and K. Fu, "Data Coherence Problem in a Multicache System," IEEE Transactions on Computers, vol. c-34, No. 1, pp. 56–65, Jan., 1985.

R. N. Rechtaschaffen and R. J. Sparacio, "Improved Sharing Of Modified Lines In Tightly-Coupled Multiprocessor Configurations," IBM Technical Disclosure Bulletin, vol. 30, No. 9, p. 434, Feb., 1988.

Agarwal, et al., "An Evaluation of Directory Schemes for Cache Coherence," IEEE, pp. 280–289, Sanford University, California, 1988.

L. M. Censier and P. Featurier, "A New Solution to Coherence Problems in Multicache Systems," IEEE Transactions on Computers, vol. c-27, No. 12, pp. 1112–1118, Dec., 1978.

M. Dubois and F. A. Briggs, "Effects of Cache Coherency in Multiprocessors," IEEE Transactions on Computers, vol. c-31, No. 11, Nov., 1982.

*Primary Examiner*—David L. Robertson
*Attorney, Agent, or Firm*—Sterne, Kessler Goldstein & Fox

[57] ABSTRACT

A directory-based protocol is provided for maintaining data coherency in a multiprocessing (MP) system having a number of processors with associated write-back caches, a multistage interconnection network (MIN) leading to a shared memory, and a global directory associated with the main memory to keep track of state and control information of cache lines. Upon a request by a requesting cache for a cache line which has been exclusively modified by a source cache, two buffers are situated in the global directory to collectively intercept modified data words of the modified cache line during the write-back to memory. A modified word buffer is used to capture modified words within the modified cache line. Moreover, a line buffer stores an old cache line transferred from the memory, during the write back operation. Finally, the line buffer and the modified word buffer, together, provide the entire modified line to a requesting cache.

17 Claims, 14 Drawing Sheets

STEP 2: WRITE-BACK REQUEST SENT TO P2 FROM GD4. CONCURRENTLY, REQUEST TO TRANSFER LINE L FROM M4 TO LINE BUFFER IN GD4.

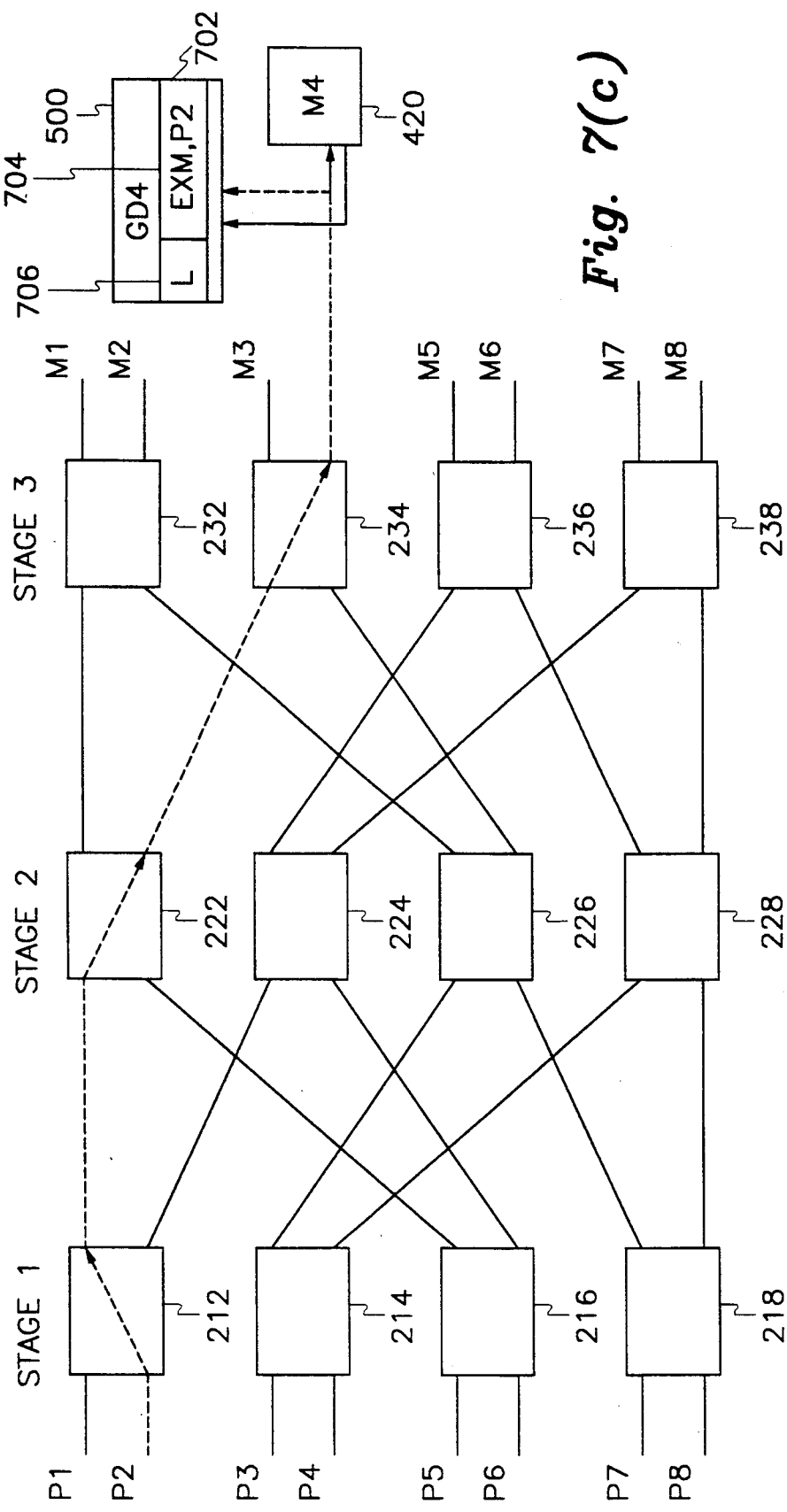

OPTIMUM WRITE-BACK STRATEGY FOR DIRECTORY-BASED CACHE COHERENCE PROTOCOLS

TECHNICAL FIELD

The present invention relates to data processing in a multiprocessing (MP) system with multiple caches and shared memory. More specifically, the present invention is directed to a system and method for maintaining coherency of data sharing among processors of an MP system.

BACKGROUND ART

The advent of parallel processing in MP systems has resulted in the potential for a substantial increase in performance over traditional uniprocessor systems. Numerous processors in an MP system can simultaneously communicate in parallel to memory via a multistage interconnection network (MIN), which have been known in the art for decades.

More specifically, in a usual MIN configuration, the processors are connected to a unique port of the MIN. A conventional MIN has stages of controllable switches. By way of the controllable switches, the MIN can channel one or more of the memory lines to any of the processors at any given time. Essentially, the MIN can permit several processors to communicate simultaneously to the memory, thus facilitating true parallel processing.

However, as more processors are added to an MP system and as the speed of processors is continuously enhanced in the art, the main memory bandwidth has not been able to keep pace with the demands imposed by the numerous high performance processors. More specifically, the memory access time for processors generally increases as the main memory is situated further away from processors and also as more and more processors fight for access to the main memory. Thus, the main memory bandwidth has transformed into the primary bottleneck for high performance data processing in an MP system.

In order to alleviate this bottleneck, a cache memory can be associated with a processor to reduce the memory access time for the processor. Cache memories are well known in the art. A cache memory is a high speed, hardware-managed buffer which is virtually transparent to computer programming. A cache memory comprises a data array having cache data lines, which is the basic unit of data transfer between the main memory and the cache, and a directory for mapping the data address to the location of the data within the data array. Substantively, cache data lines could be either instructions or actual data. Further, the cache is typically an order of magnitude faster than the main memory, and usually matches the high speed of its associated processor.

Performance is enhanced by a cache associated with a processor by taking advantage of the program structure being executed in the associated processor. Many instructions in an instruction set within the program are repetitious. The cache can be filled with cache lines, which can sustain the processor's need for data words and instructions over a time period, before a refill of cache lines is needed. In other words, processors request data words (e.g., words, dwords, or bytes), which are much smaller than cache data lines. Moreover, if a data word is sought in a cache by a processor and the data word is found in a cache data line, then a cache "hit" is said to have occurred. If a data word is sought in a cache by a processor and the data word is not found in any cache data line, then a cache "miss" is said to have occurred, and accordingly, a refill of a cache line is sought. In a sense, the cache serves as a large buffer between the processor and the main memory.

In an MP system with many processors which share memory space, or have a global memory, the MP system must maintain "coherency", or consistency, among all data in the shared memory space. Data could exist in several different locations including in the main memory and in other remote memory locations, such as in caches.

"Coherency" refers to the concept in which each processor must have access to the latest data corresponding to a particular address in the shared memory. In other words, if a data word at a certain address is simultaneously shared by one or more caches and/or the main memory, then as the data word is updated or changed in one of the foregoing memory locations, the latest version of the data word must be identified and available to all of the processors in order to maintain data consistency. Note that in this document, "data" refers to any information stored in memory, including instructions or actual, processed or unprocessed data.

In order to maintain coherency, both software and hardware approaches are conventionally employed. Moreover, the hardware approaches can generally be divided into two types: bus-based ("snoopy") protocols and directory-based protocols. Bus-based protocols are used in MP systems with a relatively small number of processors, whereas directory-based protocols are used in larger MP systems with improved scalability. Because the latest trend is towards the use of many processors for parallel processing which has led to common use of MINS, the trend in terms of protocols is towards the use of directory-based protocols.

With respect to the directory-based protocols, "cross interrogations" are periodically performed among the caches during the operation of the MP system to insure coherency, or consistency, among the data. Cross interrogations may be implemented using any of a number of different protocols. Typically, cross interrogations involve the transfer of cache lines and/or the manipulation of control bits in the directories of the caches.

The protocol implemented for the cross interrogations depends, in large part, on the types of caches used in the MP system. Conventionally, caches have been classified historically as either "write-thru" (WT) or "write-back" (WB). Further, pursuant to current design, some caches have the ability to treat data in either fashion if controlled properly.

In WT caches, a data word is "written through" to the main memory upon each update or change of the data word in the cache line by any processor. Accordingly, the most current data is always in the main memory.

In a WB cache, a data word is written from the WB cache to the main memory only when it is requested by a remote source or when it is replaced in the cache. Consequently, a local processor can change data words in a local WB cache many times without other memory locations in the MP system knowing of or being interrupted by the changes.

When WB caches are used in an MP system having a MIN, a global directory can be employed, which is well known in the art. The global directory is associated with the main memory in order to aid in maintaining coherency. The global directory primarily contains information used to determine the global state of a cache data line-as well as the number and/or location of the caches having a copy of the cache line. In this regard, see M. Dubois and F. A. Briggs, "Effects of Cache Coherency in Multiprocessors," *IEEE Transactions on Computers*, vol. C-31, no. 11, November 1982 and A. Agarwal, R. Simoni, J. Hennessy, and M. Horowitz, "An Evaluation of Directory Schemes for Cache Coherence", *Proceedings of the* 1988 *International Symposium on Computer Architecture,* pp. 280-289, 1988.

While some work has been performed in the art in regard to directory-based protocols, few practical designs are available for use. Moreover, the available conventional protocols are problematic. Each time that a cross interrogation is initiated, any processor using a cache must temporarily wait while an inquiry is made for the data word in the cache. Consequently, the performance of processors is compromised because of the cache inquiries. Furthermore, as more processors are added to the MP system, a higher number of cross interrogations must take place. Consequently, more interactions must occur with the caches, resulting in much expended time, and the interconnection network of the MP system is characterized by heavy traffic. Accordingly, in a broad sense the numerous requisite cross interrogations reduce the number of processors conducting useful work in the MP system.

DISCLOSURE OF THE INVENTION

The present invention implements a modified word buffer and a line buffer in the global directory of an MP system having caches, shared memory, and a MIN. The global directory is configured to store state and control information pertaining to cache lines and to control the modified word buffer and the line buffer.

In accordance with the present invention, a requesting cache will initially send a request to the global directory for a cache line. The global directory will determine that the line has been modified and is residing in a source cache.

Next, a request is sent from the global directory to the source cache for the write-back of only the modified words in the cache line, and concurrently, a request is sent from the global directory to the memory for the transfer of the old cache line from the memory.

Further, during write-back of the modified words, the modified words are captured by a modified word buffer of the global directory, and concurrently, the old cache line from the memory is stored in a line buffer of the global directory. The old cache line corresponds in address identity with the modified cache line, but portions of it are unusable because it is not the latest version of the cache line.

Finally, the entire modified cache line is transferred from the global directory to the requesting cache wherein the modified words are supplied by the modified word buffer and the remainder of the cache line is supplied by the line buffer.

The present invention overcomes the deficiencies of the prior art, as noted above, and further provides for the following additional advantages.

The present invention provides a very desirable, high performance write-back strategy for directory-based coherence protocols in MP systems.

More specifically, the present invention improves the performance of an MP system by allowing the following actions to occur concurrently: (1) data line transfers between the global directory and the memory and (2) write-back operations from processors to memory.

As a result of the foregoing concurrent actions, the time required to process a read request from a processor is extremely reduced (by approx. 44%). The reason is that much of the time involved in waiting for the memory to process a data line request is eliminated. In the conventional protocol, a data line is transferred to a requesting cache only after all modified words are written back to the memory, thereby causing a delay.

In a broad sense, the present invention reduces the time necessary for maintaining coherency, and therefore, eases any performance degradation incident to the addition of more processors to an MP system. In other words, the limit on the number of processors which can be added to the MP system is effectively increased by the present invention.

Further advantages of the present invention will become apparent to one skilled in the art upon examination of the following drawings and the detailed description. It is intended that any additional advantages be incorporated herein.

BRIEF DESCRIPTION OF DRAWINGS

The present invention, as defined in the claims, can be better understood with reference to the text and drawings.

FIG. 4(a)-(e) shows a conventional protocol for maintaining coherency in an eight processor system with a three stage MIN, wherein FIGS. 4(a)-4(e) illustrate the steps for copying a modified data line L, which is exclusively owned by a processor $P_2$, in the cache associated with a processor $P_6$;

FIGS. 7(a)-(d) show a protocol in accordance with the present invention for maintaining coherency in an eight processor system with a three stage MIN, wherein FIGS. 7(a)-(d) illustrate the steps for copying a modified data line L, which is exclusively owned by processor $P_2$, in the cache associated with a processor $P_6$.

BEST MODE FOR CARRYING OUT THE INVENTION

Figure 1:
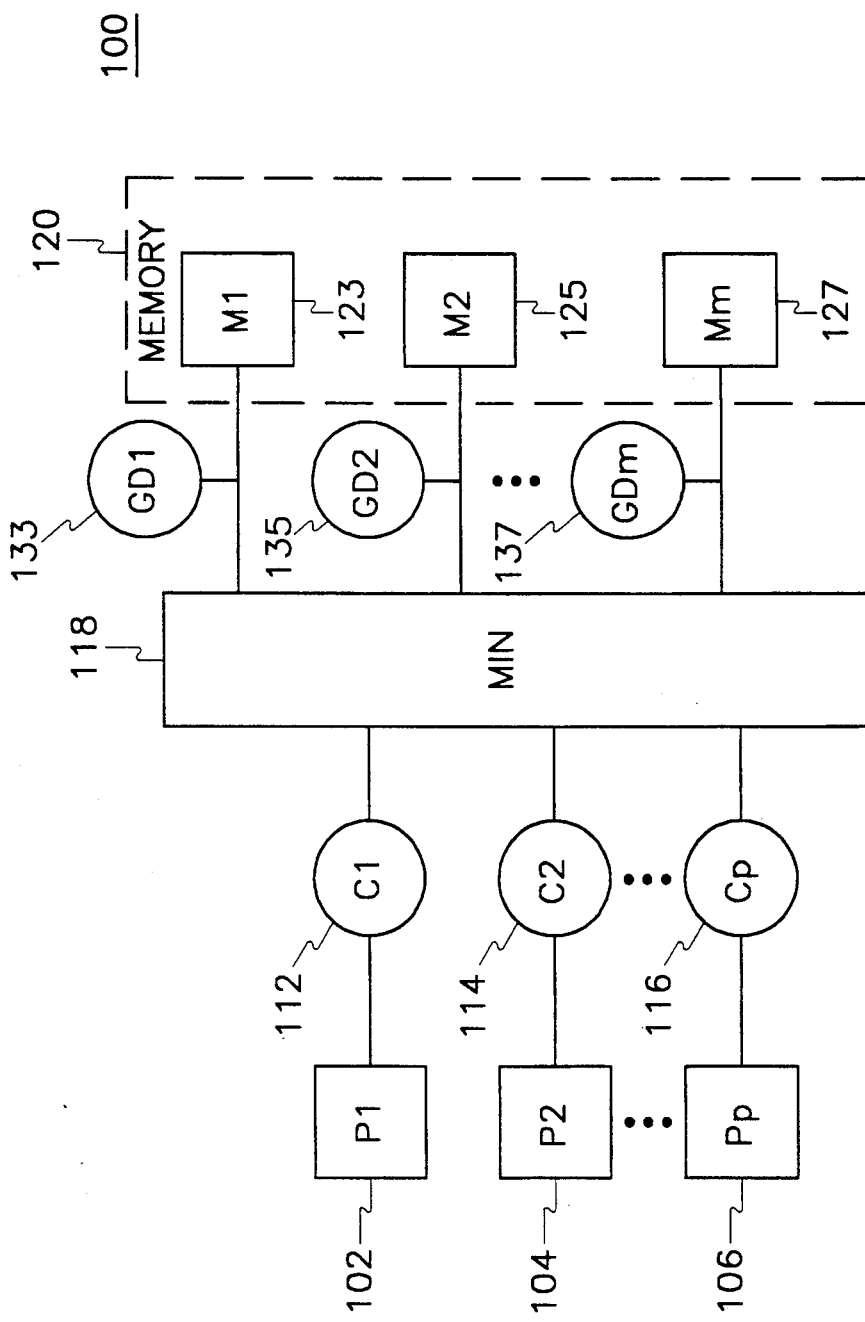
FIG. 1 illustrates a block diagram of a multiprocessor (MP) architecture comprising p processors with p associated caches connected via a multistage interconnection network (MIN) to a memory having m memory modules (MM) with m associated global directories.

FIG. 1 illustrates a block diagram of a multiprocessor (MP) architecture 100 wherein the present invention may be practiced. The multiprocessor architecture 100 comprises "p" processors 102-106 with "p" associated caches 112-116. The p caches 112-116 could comprise several conceptual levels of caches, which levels are known in the conventional art.

The caches 112–116 are connected via a multistage interconnection network (MIN) 118 to a memory 120. The MIN 118 controls access of the p processors 102–106 to and from the memory 120. The memory 120 has "m" memory modules (MM) 123–127 with "m" associated global directories 133–137. Global directories are well known in the art for use in maintaining coherency, as discussed in the Background section of this document.

It should be noted that the MIN 118 could have any number of inputs and outputs, and also, the number of inputs and outputs need not be equivalent.

Figure 2:
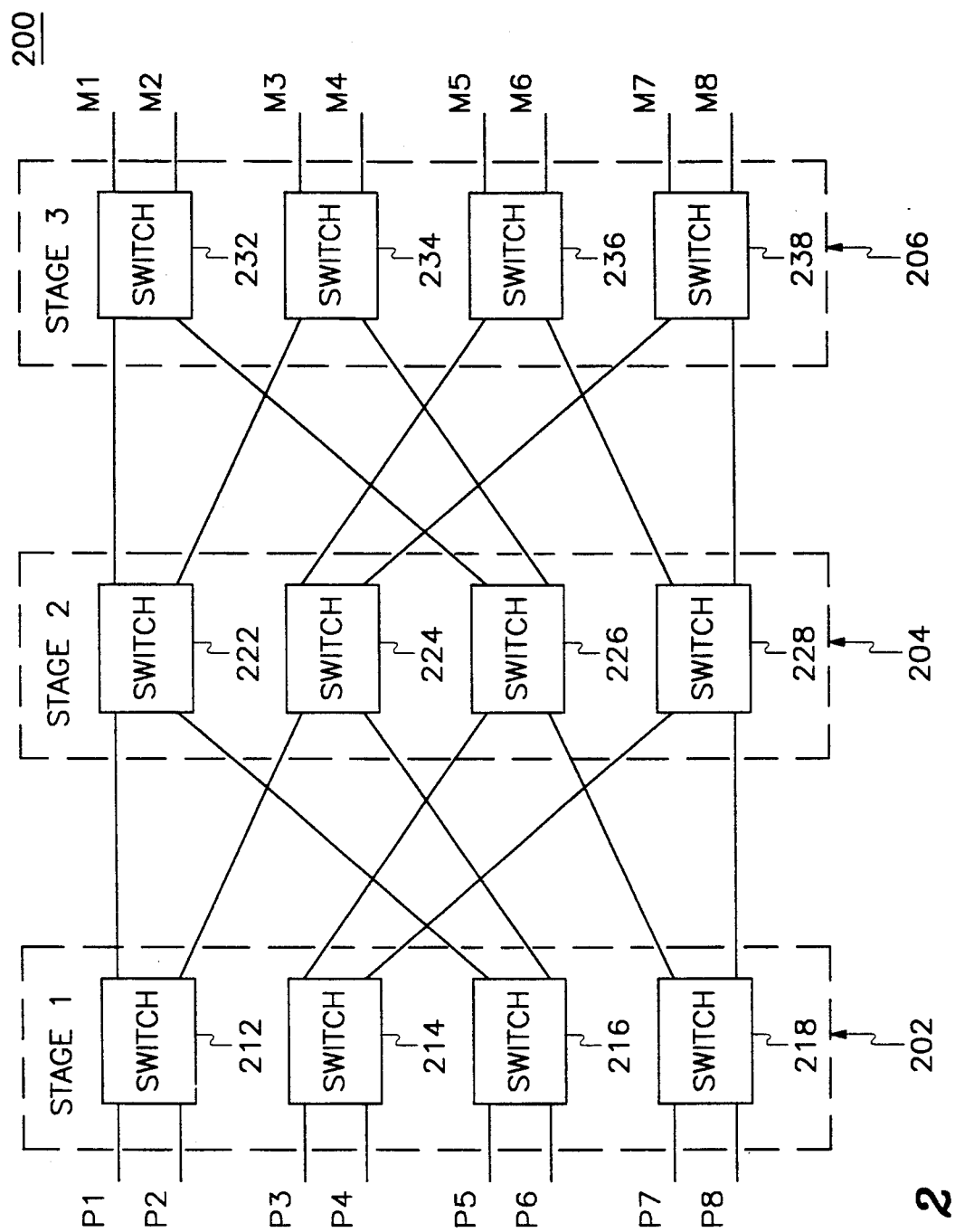
FIG. 2 shows a low level block diagram of a MIN for an eight processor system wherein the MIN has four 2*2 switches for each of three stages.

FIG. 2 shows a low level block diagram of a MIN 200 for an eight processor system. As shown, the MIN 200 has four similar 2*2 switches for each of three stages 1–3, denoted respectively by reference numerals 202–206. Stage 1 comprises 2*2 switches 212–218. Stage 2 comprises 2*2 switches 222–228. Stage 3 comprises 2*2 switches 232–238. As the number of processors increases in the MP system, the number of stages and 2*2 switches per stage increases as well.

Figure 3:
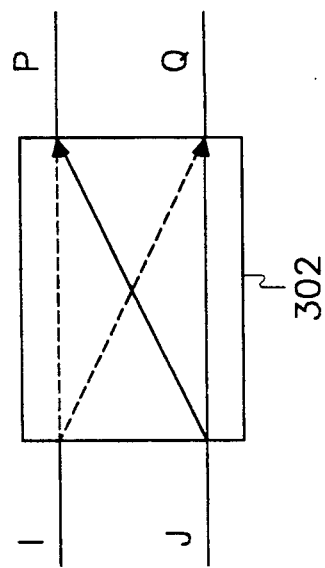
FIG. 3 illustrates a 2*2 switch of FIG. 2 with inputs I,J and outputs P,Q.

A typical example of the 2*2 switches of FIG. 2 is shown in further detail in FIG. 3. As shown in FIG. 3, a 2*2 switch 302 has inputs I,J and outputs P,Q. Input I can be connected to either output P or output Q. Likewise, input J can be connected to either output P or output Q. The connections are effectuated via control signals. Worth noting is that the present invention is not limited to switches 202–238 with a 2*2 configuration. In other words, each of the switches 202–238 could have an m*n configuration, where m and n are any number.

A conventional protocol for maintaining coherency in an eight processor system with the three-stage MIN 200 of FIG. 2 is described with reference to FIGS. 4(a)–4(e). FIGS. 4(a)–4(e) essentially illustrate the requisite conventional steps for copying a modified data line L, which is exclusively owned by processor $P_2$, into the cache associated with a processor $P_6$.

Initially, assume that a line L is stored in memory at a memory module $M_4$. Moreover, the two processors $P_2$ and $P_6$ currently share a copy of the data line L in a cache (s) associated with the processors. Further assume that processor $P_2$ has modified the data in its copy of line L. Therefore, processor $P_2$ has an exclusive modified (EXM) copy of the line L; line L is not resident in the cache of processor $P_6$. Suppose, now, that processor $P_6$ wants to read some data located in the line L. Thus, the modified data line L, which is exclusively owned by processor $P_2$, must be written into the cache associated with a processor $P_6$.

Figure 4A:
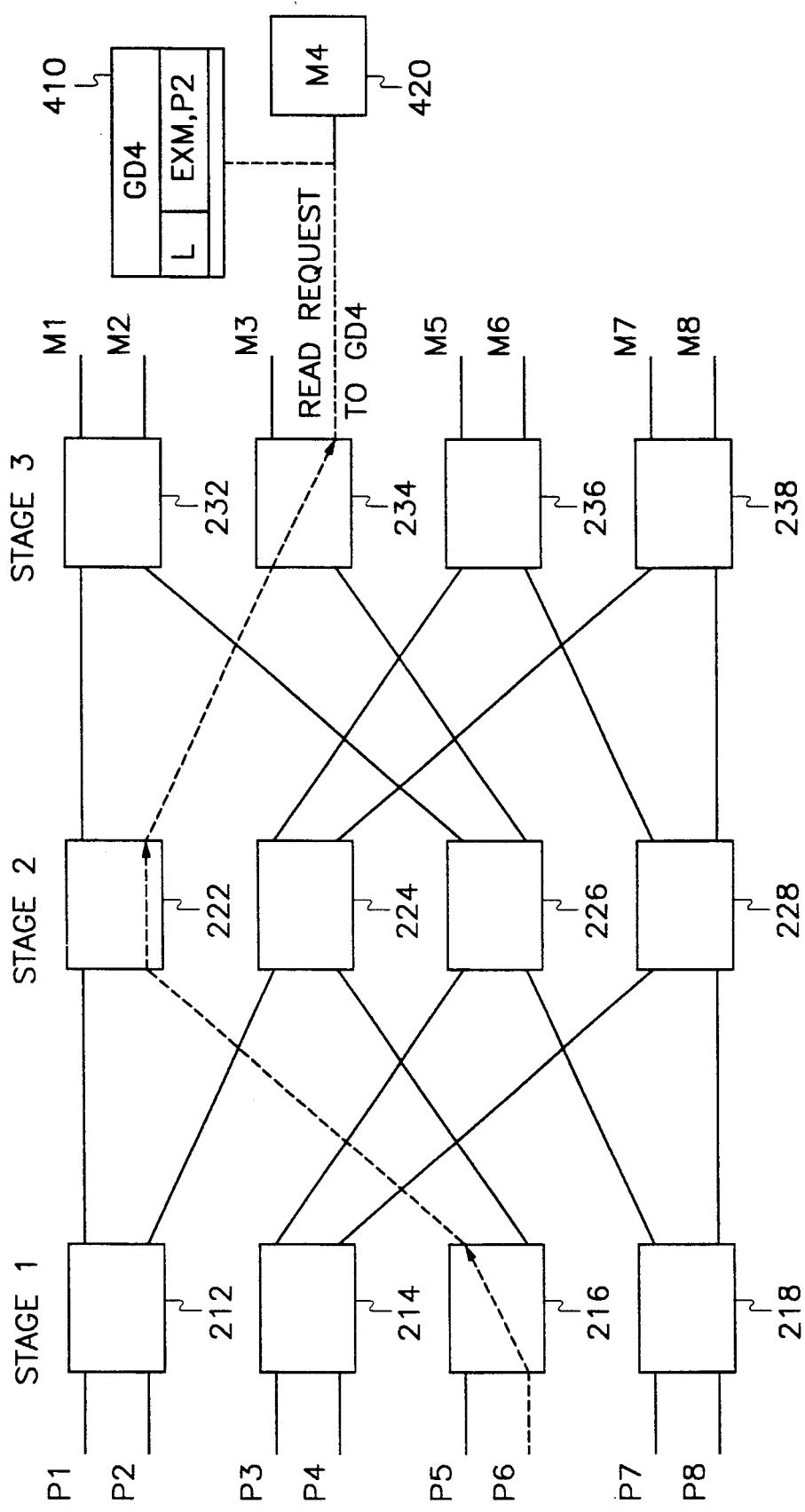

Conventionally, processor $P_6$ will first request a read of the line L. With reference to FIG. 4(a), a "read request" is transmitted from the processor $P_6$, through the MIN 200, ultimately to the global directory 4, denoted by reference numeral 410, which is associated with the memory module 4, denoted by reference numeral 420. As shown, while in the MIN 200, the read request travels successively through the switches 216, 222, and 234, in order to reach the global directory $GD_4$.

Figure 4B:
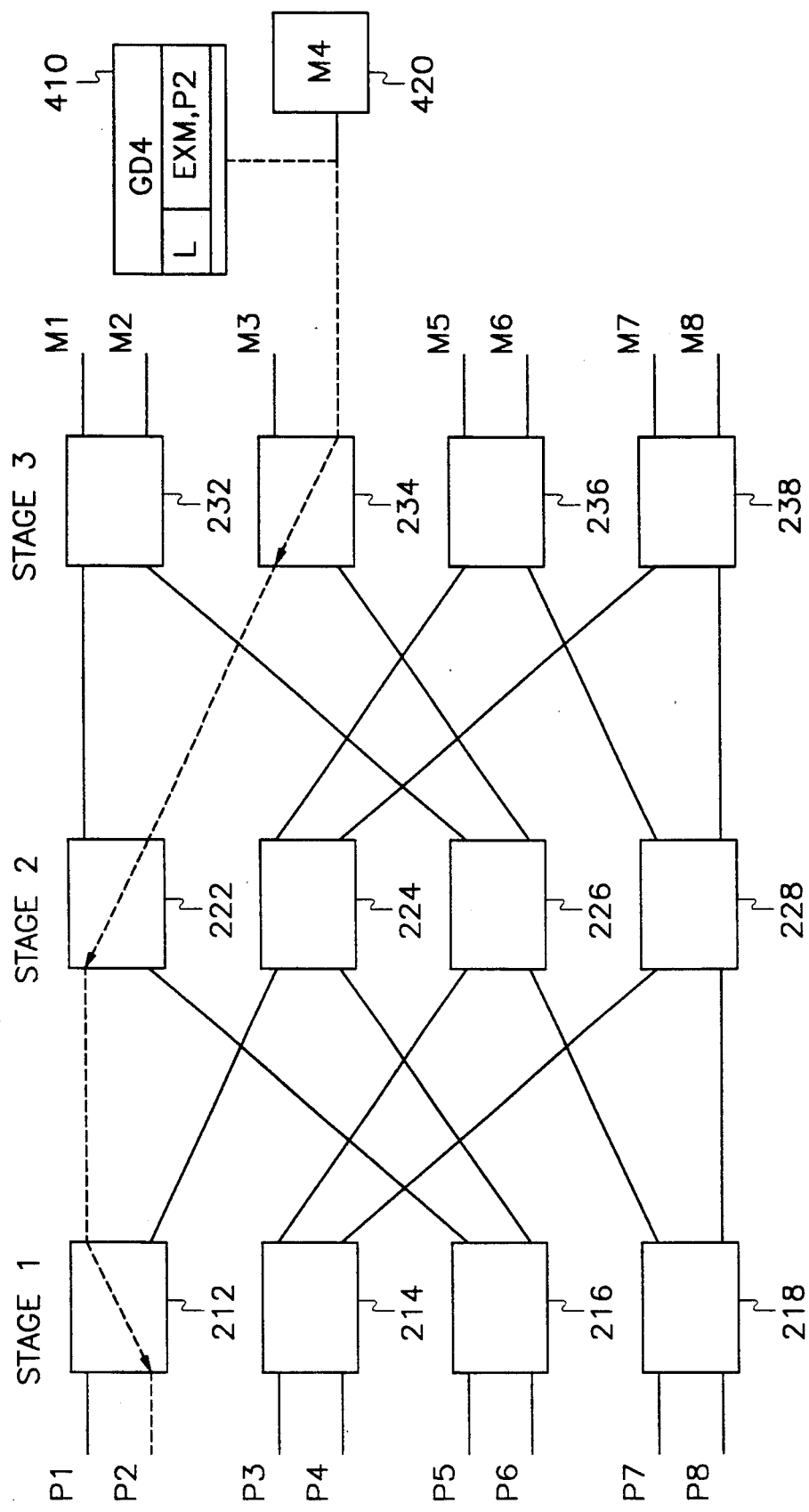
Figure 4C:
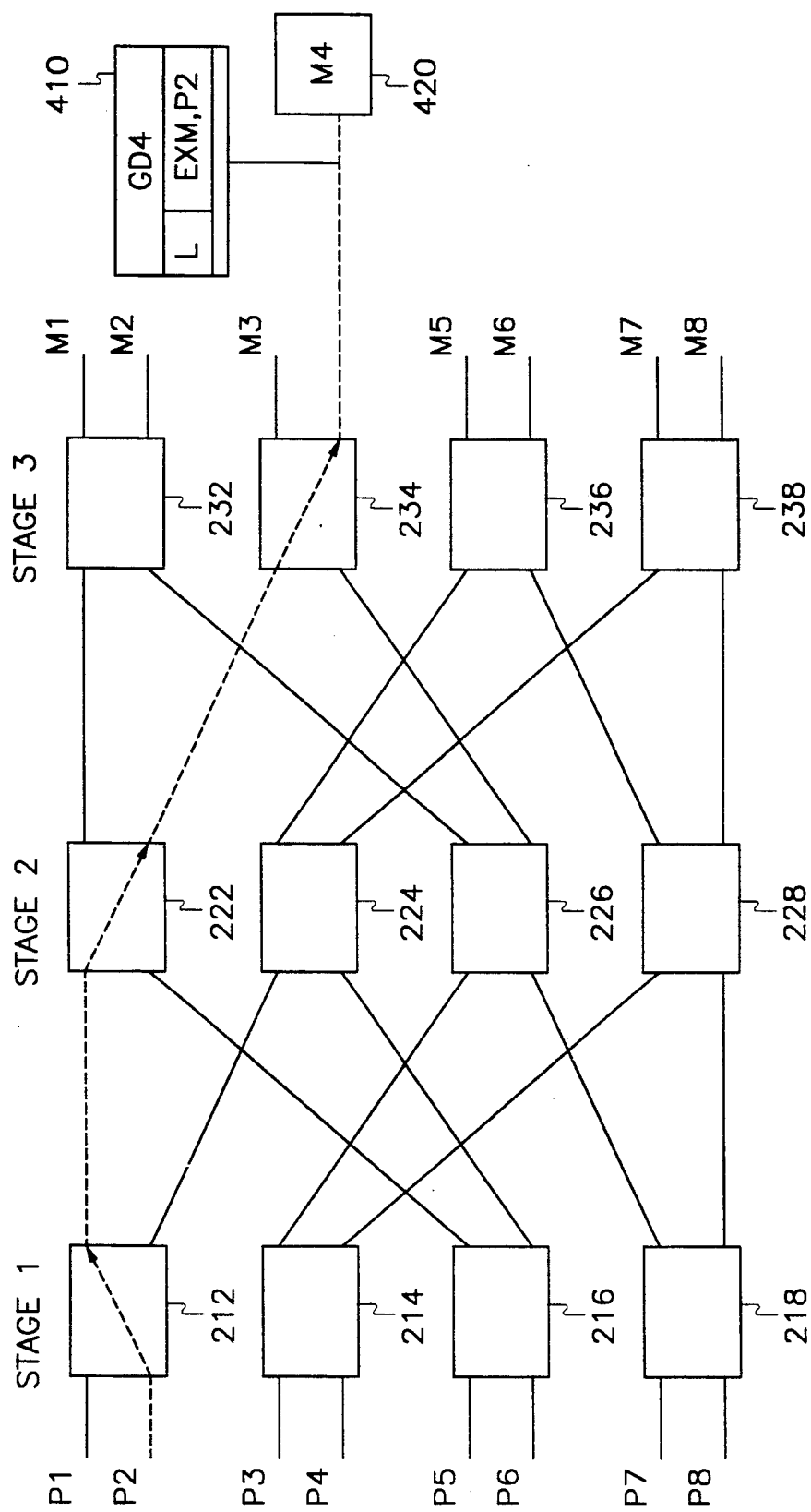

The second step is described in regard to FIG. 4(b). The global directory 4 sends a "write-back request" to the processor $P_2$. The write-back request travels successively through switches 234, 222, and 212, in order to reach the processor $P_2$. The third step of the protocol is shown in FIG. 4(c). The processor $P_2$ transfers the modified data in the line L to the memory module $M_4$, via switches 212, 222, and 234.

Figure 4D:
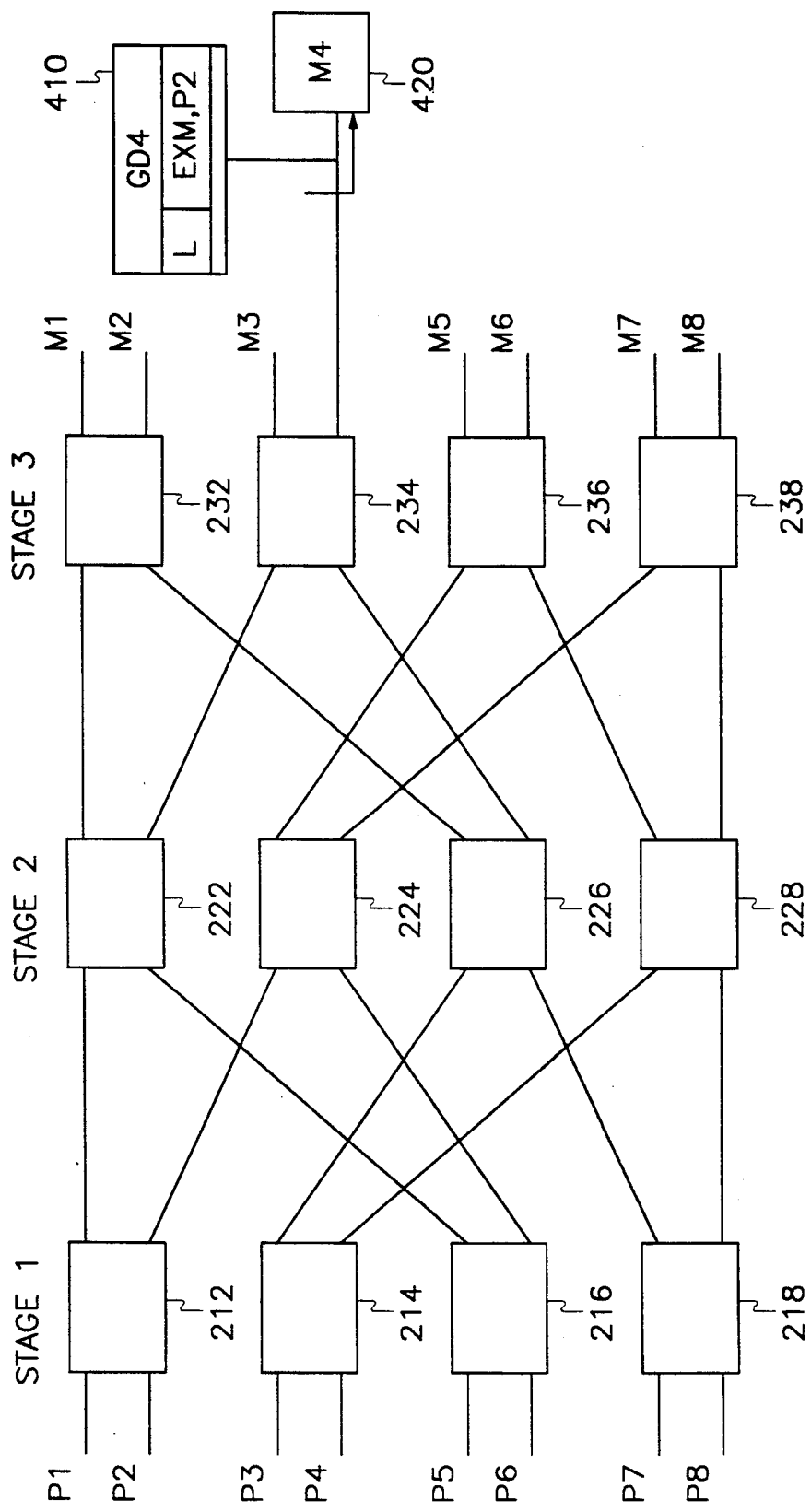

The fourth step of the protocol is illustrated in FIG. 4(d). The global directory $GD_4$ requests to transfer the line L from the memory module $M_4$ to the processor $P_6$.

Figure 4E:
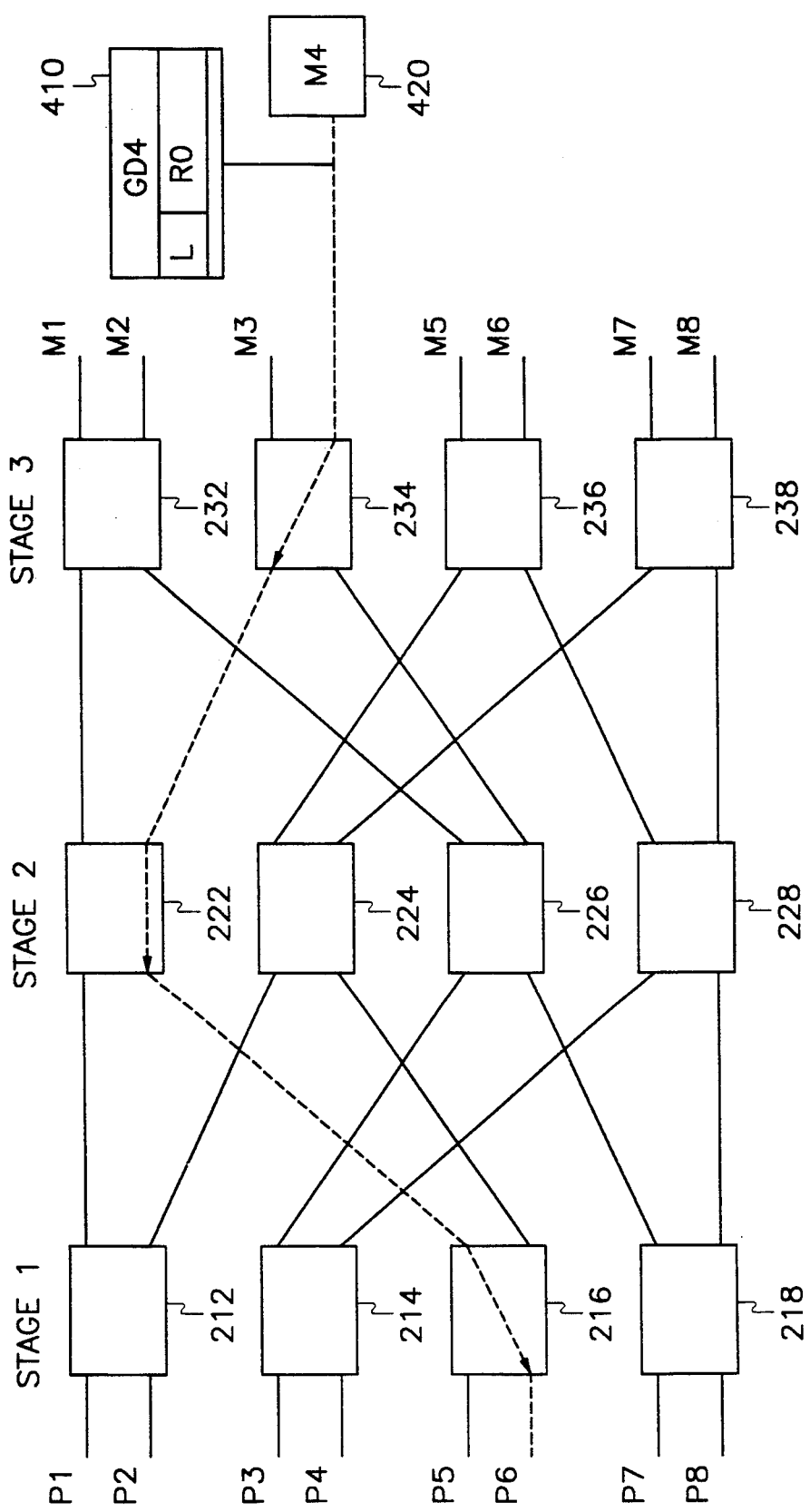

Finally, with reference to FIG. 4(e), the line L is transferred from the memory module $M_4$ to processor $P_6$, via successive travel through switches 234, 222, and 216.

From a performance perspective, the time expended for implementing the foregoing protocol can be relatively substantial. Typically, the switching time for the 2*2 switches 212–238 is about one clock cycle. The access time for the global directory 410, for example, is approximately one clock cycle. Moreover, the access time for the memory module 420, for example, is around six clock cycles.

Assuming that the preceding switching and access times are applicable to the conventional coherency protocol, the time necessary to perform the coherency protocol as set forth in FIGS. 4(a)–4(e) is approximately 25 clock cycles, based upon the analysis indicated in Table A below.

TABLE A

| Step In Coherency Protocol | Switching Time (clock cycles) For 2*2 Switches | Access Time (clock cycles) For Global Directory $GD_4$ | Access Time (clock cycles) For Memory Module $M_4$ | TOTAL TIME |
| --- | --- | --- | --- | --- |
| 1 | 3 | 1 | 0 | 4 |
| 2 | 3 | 0 | 0 | 3 |
| 3 | 3 | 0 | 6 | 9 |
| 4 | 0 | 0 | 6 | 6 |
| 5 | 3 | 0 | 0 | 3 |
|  |  |  |  | 25 |

Figure 5:
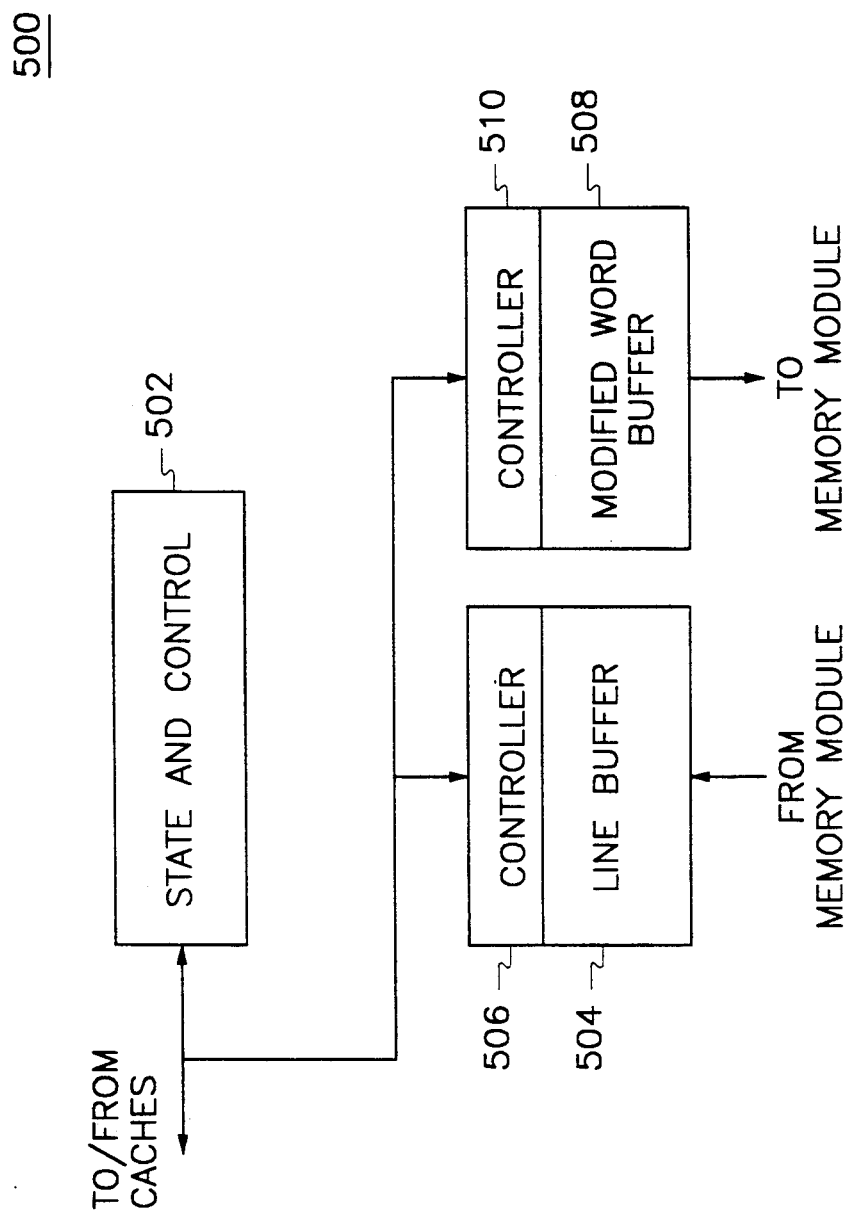
FIG. 5 illustrates a high level block diagram of the global directory in accordance with the present invention.

FIG. 5 illustrates a high level block diagram of a global directory 500 in accordance with the present invention. Because of the global directory 500, an optimum write-back protocol can be implemented to desirably enhance performance.

As shown, the novel global directory 500 has a state and control block 502, a line buffer 504 with an associated controller 506, and a word buffer 508 with an associated controller 510. A significant feature of the present invention is the inclusion of the buffers 504 and 508 which can capture and store modified words of a cache line which are directed, or written back, to the memory, before the modified data is stored in the memory.

Figure 6:
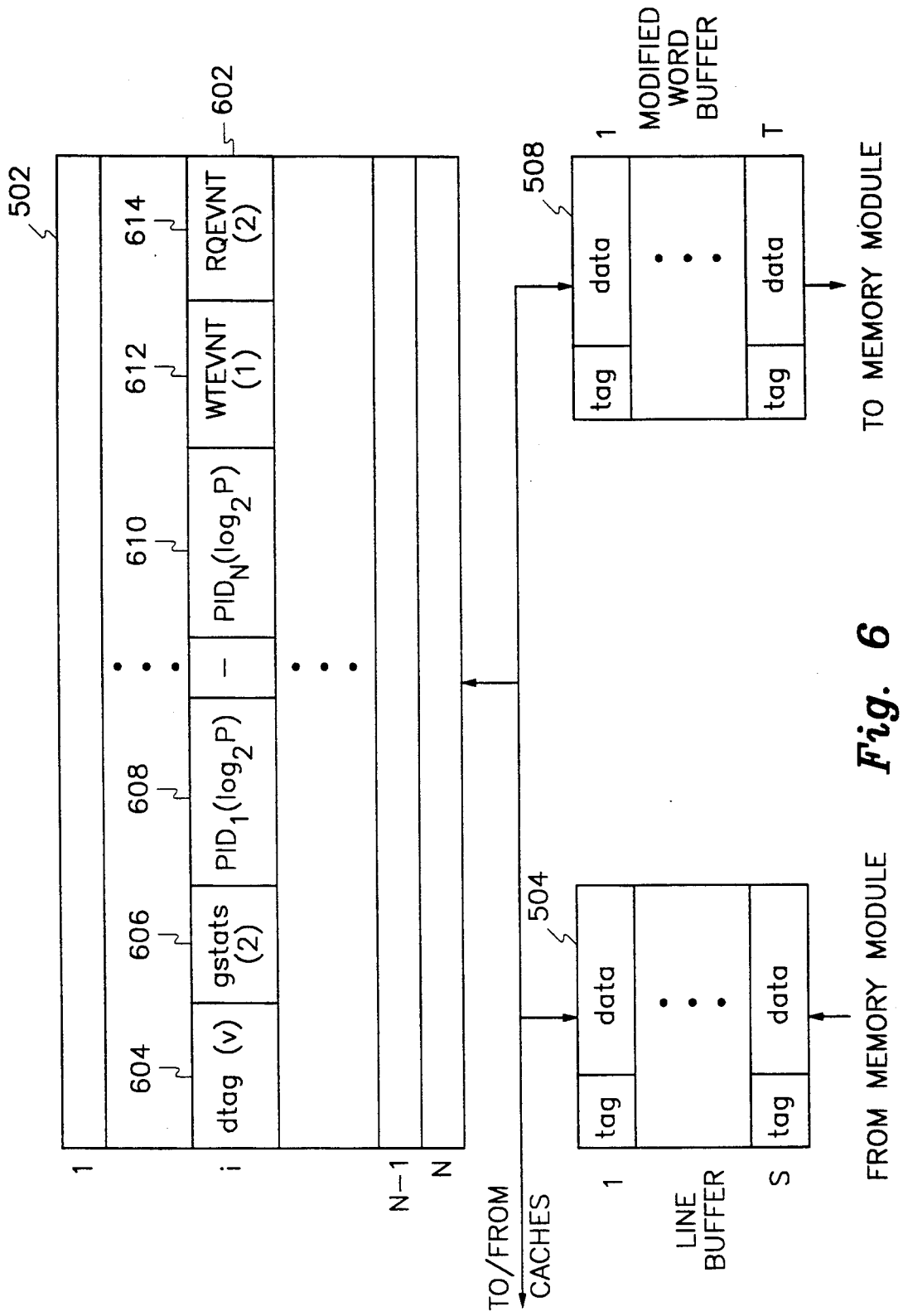
FIG. 6 illustrates a low level block diagram of FIG. 5.

In order to understand the foregoing concept more clearly, FIG. 6 illustrates a low level block diagram of the novel global directory 500 of FIG. 5.

As shown in FIG. 5, the state and control block 502 comprises "N" state lines. The N state lines monitor the cache lines in the MP system. The N state lines could correspond to all of the cache lines in the MP system, or a subset thereof. In the case of a subset, the remaining state lines could be stored at some other memory location and retrieved when necessary.

Each of the N state lines, as indicated by reference numeral 602, comprises a number of indicators which can be manipulated by the control. For instance, each of the N state lines has a directory tag (dtag) 604. The dtag 604 is merely a binary code which uniquely identifies a cache line.

Each of the N state lines has a global state (gstats) indicator 606. In the preferred embodiment, the global state indicator 606 comprises two bits for indicating a total of four different global states, namely, "exclusive", "exclusive modify" (EXM), "read only", and "not present" in any of the p caches of the MP system.

As indicated by reference numerals 608–610, a processor identification (PID) will indicate which processor corresponds to the state line 602. For example, "$PID_x(log_2P)$" indicates that out of the p processors, processor "x" corresponds to the state line 602.

Each of the N state lines has a wait event (WTEVNT) indicator 612 specifying whether the state line is waiting for a write-back, or some other event, to occur from a processor. In the preferred embodiment, the WTEVNT indicator 612 is a single bit. If a request for the data line identified by the state line occurs while the state line 602 is waiting for a write back, then the request will not be processed by the global directory 500 until the write back has occurred.

Finally, each of the N state lines has a request event (RQEVNT) indicator 614 specifying the event which caused the write-back to occur. In the preferred embodiment, the RQEVNT indicator 614 comprises two bits for specifying three states, namely, "read request", "store request", and "modify request". The line buffer 504 has "S" data lines, which comprise data preceded by a unique tag. Further, the word buffer 508 has "T" data words, which comprise data preceded by a unique tag.

In contrast to the conventional protocol described previously with reference to FIG. 4, FIG. 7(a)–7(d) will be used to describe, hereafter, a novel protocol in accordance with the present invention for maintaining coherency in an MP system. Specifically, FIGS. 7(a)–(d) are directed to an exemplary eight processor system, just as the FIGS. 4(a)–4(e). The number of processors (i.e., eight) is chosen arbitrarily for discussion purposes. Sequentially, the FIGS. 7(a)–7(d) illustrate the successive steps for copying a modified data line L, which is exclusively owned by processor $P_2$, in the cache associated with a processor $P_6$.

Figure 7A:
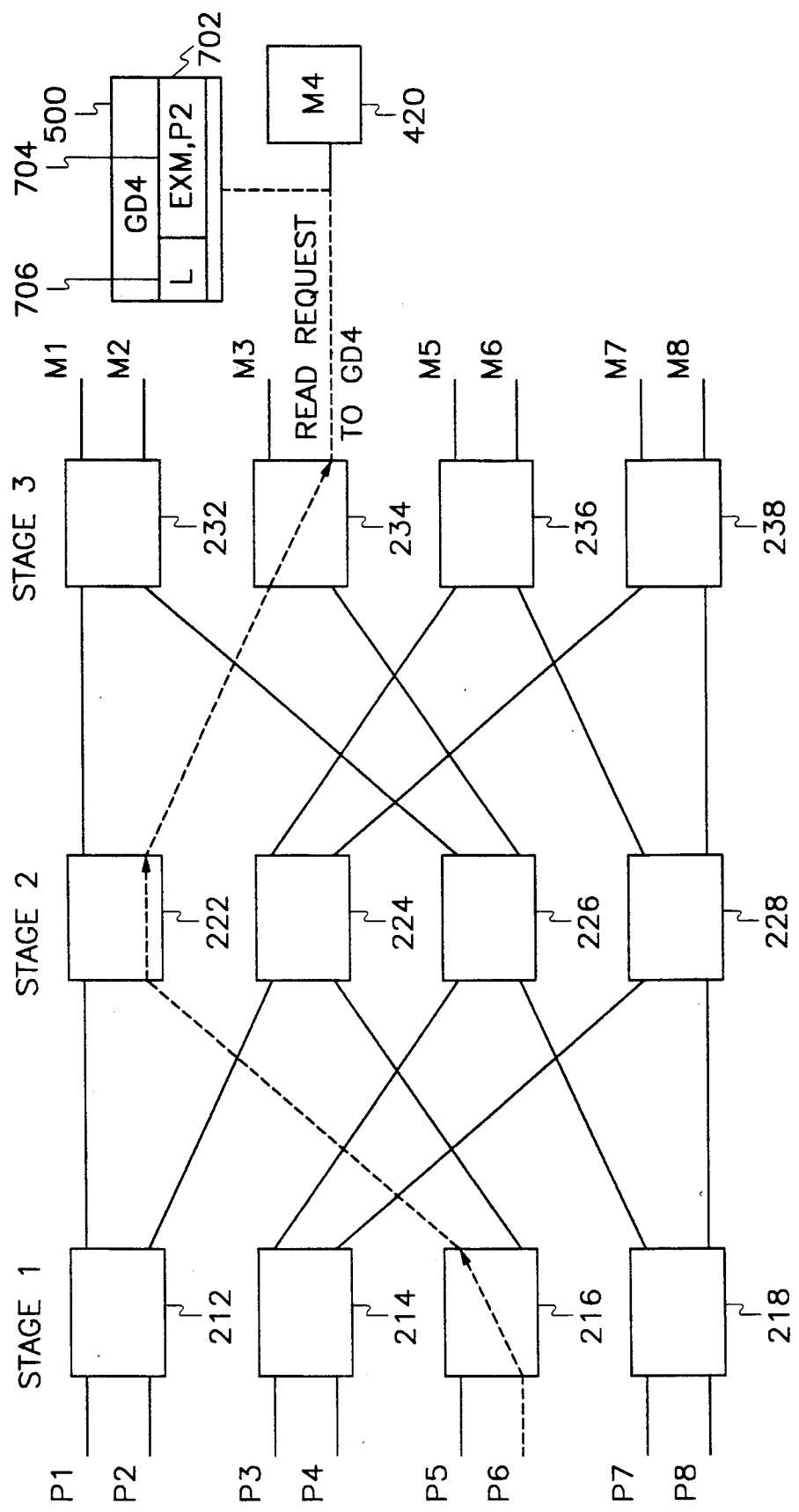

Initially, as shown in FIG. 7(a), in the state and control block 502 of the global directory 500, a state line 702 (one of "N") corresponding to the modified data line L will indicate that processor $P_2$ has the exclusively modified copy of the data line L. Specifically, the processor identification (PID) of the state line 702 will be "$PID_2(log_2P)$", indicating the processor $P_2$ has the data line. Moreover, the global state (gstats) indicator would be set to indicate that the line L has been exclusively modified (EXM), as shown in the block designated by reference numeral 704.

With reference to FIG. 7(a), a read request (Step 1) is sent from the processor $P_6$ to the global directory $GD_4$ via switches 216, 222, and 234. The control block 502 of the global directory 500 will match the read request to the particular state line 702 via the unique dtag 706. The control of the global directory $GD_4$ will recognize the states of the PID and the gstats; thus, it will recognize that the processor $P_2$ has the exclusively modified line L.

Figure 7B:
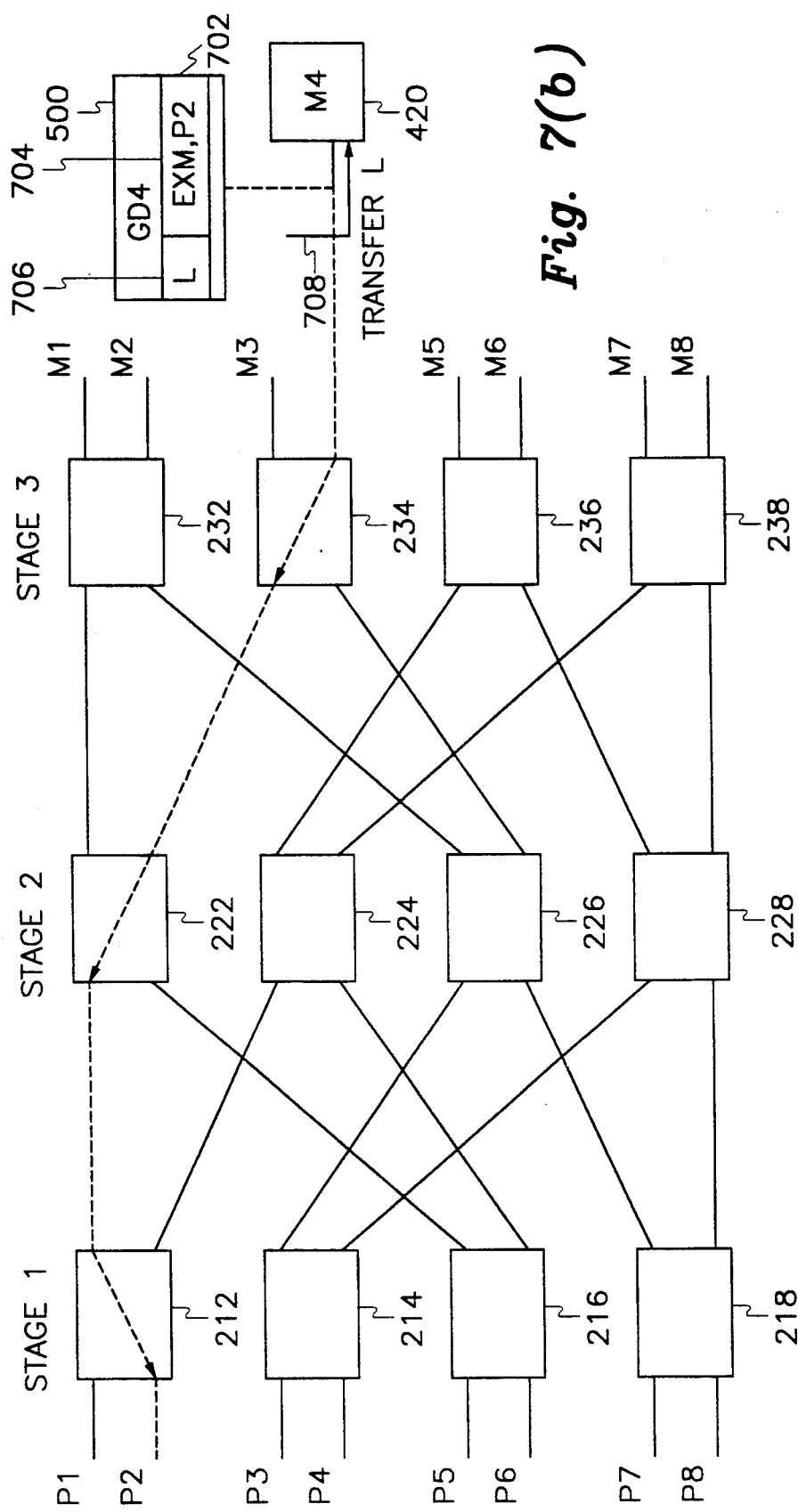

Next, as shown in FIG. 7(b), a write-back request (Step 2) is sent to processor $P_2$ from the global directory $GD_4$ by way of, respectively, the switches 234, 222, and 212. Concurrently with the foregoing action, a transfer request is sent from the global directory $GD_4$ to the memory module $M_4$, as shown by an arrow 708. Essentially, the transfer request solicits the transfer of line L from the memory module $M_4$ to the line buffer 504 of the global directory $GD_4$.

During the previous step 2, the global directory control 502 of the global directory 500 will manipulate the WTEVNT indicator 612 and the RQEVNT indicator 614. The global directory control 502 sets the WTEVNT indicator 612 to indicate that the global directory control 502 is waiting for a processor to write back data. In other words, any request for the data line identified by the state line 702, while the global directory control 502 is waiting for processor $P_2$ to modify the data line, will not be processed by the global directory control 502 until the write back from processor $P_2$ has occurred. Moreover, the global directory control 502 sets the RQEVNT indicator 614 for a "read request", because processor $P_6$ sent a read request.

As shown in FIG. 7(c) during the next step, the modified data line L is transferred from the processor $P_2$ simultaneously to both the memory module 4 (reference numeral 420) and the global directory $GD_4$ (reference numeral 500). Concurrently with the foregoing action, the request for line L transfer is processed in the memory module $M_4$, and the line L is transferred from the memory module $M_4$ to the line buffer 504 in the global directory $GD_4$. In most cases, the global directory 500 will receive the line L from the memory module $M_4$ before it receives the modified line L from the processor $P_2$.

When the global directory 500 receives the modified data line L, it will check the RQEVNT indicator 614 to determine why it is receiving a modified line L. Upon this inquiry, it will determine, in this instance, that the processor $P_6$ has issued a read request. Moreover, from a bit vector in the header of the modified data line L, the global directory 500 can determine which data words of the line L have been changed. The words that have been changed are stored in the modified word buffer 508, and the bit vector is sent to the line buffer controller 506. The line buffer controller 506 will use the information supplied by the bit vector in the next step of the protocol, as discussed below, to transfer unmodified words to the requesting processor $P_6$.

Figure 7D:
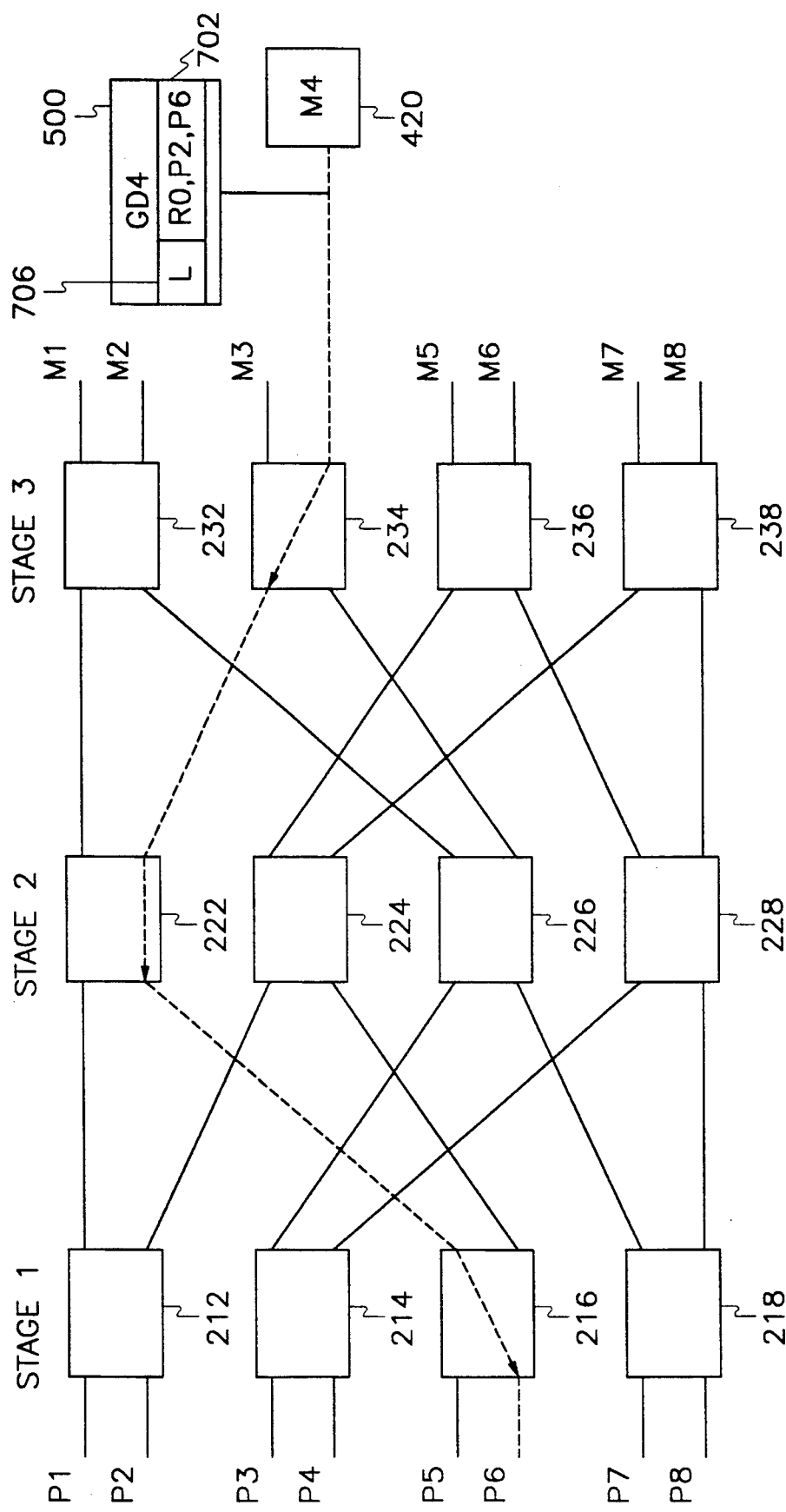

Finally, as illustrated in FIG. 7(d) in accordance with the present invention, the modified line L is transferred from the global directory $GD_4$ to the processor $P_6$. The modified words of the modified line L will be transmitted from the modified word buffer 508 to the processor $P_6$, while the remaining (unchanged) words of the line L will be transmitted from the line buffer 504 to the processor $P_6$.

After the foregoing action, the global directory control 502 will modify the gstats indicator 606 and the PID indicator 608. The global directory control 502 will set the gstats 606 of the state line 702 to "read only", shown in FIG. 7(d) as "RO", because now both processor $P_2$ and $P_6$ have a copy of the data line. Moreover, the global directory control 502 will set the PID indicator 608 to indicate that processor $P_2$ and $P_6$ presently have a copy of the data line L.

Assuming the switching and access times specified with respect to the FIGS. 4(a)–4(e), the time necessary to perform the coherency protocol in accord with the present invention is approximately 14 clock cycles, which is extremely less than the 25 clock cycles needed for the conventional coherency protocol. The 14 clock cycles is derived based upon the analysis set forth in Table B below.

TABLE B

| Step In Coherency Protocol | Switching Time (clock cycles) For 2*2 Switches | Access Time (clock cycles) For Global Directory $GD_4$ | Access Time (clock cycles) For Memory Module $M_4$ | TOTAL TIME |
|---|---|---|---|---|
| 1 | 3 | 1 | 0 | 4 |
| 2 | 3 | 0 | 0 | 3 |
| 3 | 3 | 1 | 0 | 4 |
| 4 | 3 | 0 | 0 | 3 |
|   |   |   |   | 14 |

As shown in Table B, the addition of the line buffer 504 and the modified word buffer 508 to the global directory 500 results in a 44 percent (%) reduction in the amount of time required to process the read request from processor $P_6$. The reason is that the present invention eliminates much of the time involved in waiting for the memory module $M_4$. In the conventional protocol, a line is transferred to a requesting cache only after all modified lines are written back to the memory module $M_4$. Thus, the present invention achieves high performance by permitting the following actions to occur concurrently: (1) line transfer between the global directory $GD_4$ and the memory module $M_4$ and (2) write-back operations.

The foregoing description of the preferred embodiment of the present invention has been presented for purposes of illustration and description. It is not intended to be exhaustive or to limit the present invention to the precise form disclosed, and obviously many modifications and variations are possible in light of the above teachings. For example, the present invention need not be limited to the number of processors, caches, and memory modules which are described with respect to the preferred embodiment.

The particular preferred embodiment was chosen and described in order to best explain the principles of the present invention and its practical application to those persons skilled in the art, in order to thereby enable those persons to best utilize the present invention in various embodiments with various modifications as are suited to the particular use contemplated. It is intended that the scope of the present invention be broadly defined by the following claims.

Having thus described our invention, what we claim as new and desire to secure by Letters Patent is:

1. A system for optimizing the performance of a multiprocessor system having write-back caches and a multistage interconnection network connected to a shared memory, by allowing concurrent line transfer and write-back operations, comprising:
   a modified word buffer configured to store any modified words within a modified cache line when said modified words are written back from a cache;
   a line buffer configured to store an old cache line transferred from said memory, said old cache line corresponding in address identity with said modified cache line; and
   a global directory associated with said modified word buffer and said line buffer, said global directory configured to store state and control information pertaining to cache lines, said global directory configured to request a write-back of said modified words from said cache and concurrently request said old cache line from said memory, and said global directory configured to cause said modified word buffer and said line buffer to write, in combination, said modified cache line to a requesting cache.

2. The system of claim 1, further comprising state lines available to said global directory corresponding to each cache line of the system, each of said state lines specifies a particular cache line, a global state, one or more processors owning the cache line, a wait event indicator indicating whether the state line is waiting for a write-back, and a request event indicator identifying the event which caused any write-back to occur.

3. The system of claim 1, further comprising a multistage interconnection network having three stages with four switches within each of said stages, said switches having two inputs and two outputs and configured to switch any input to any output.

4. A system for optimizing the performance of a multiprocessor system having write-back caches and a multistage interconnection network connected to a shared memory by allowing concurrent line transfer and write-back operations, comprising:
   control means for receiving requests for a modified cache line from a requesting cache, for requesting a write-back of modified words in said modified cache line from a source cache and concurrently requesting a transfer of an old cache line from the memory, said old cache line corresponding in address identity with said modified cache line, and for transferring said modified cache line to said requesting cache; and
   buffer means, connected to said control means, for capturing said modified words written back from said source cache and concurrently storing said old cache line from the memory.

5. The system of claim 4, further wherein and buffer means comprises a modified word buffer configured to store words and a line buffer configured to store said old cache line.

6. The system of claim 4, further comprising state lines available to said control means corresponding to each cache line of the system, each of said state lines specifies a particular cache line, a global state, one or more processors owning the cache line, a wait event indicator indicating whether the state line is waiting for a write-back, and a request event indicator identifying the event which caused any write-back to occur.

7. The system of claim 4, further comprising a multistage interconnection network having three stages with four switches within each of said stages, said switches having two inputs and two outputs and configured to switch any input to any output.

8. A method for controlling the performance of a multiprocessor system having write-back caches and a multistage interconnection network connected to a shared memory monitored by a global directory, the method for allowing concurrent line transfer and write-back operations, comprising the steps of:

(a) requesting the global directory for a modified cache line;

(b) requesting a write-back of modified words in said modified cache line from a source cache and concurrently requesting a transfer of an old cache line from the memory, said old cache line corresponding in address identity with said modified cache line;

(c) capturing in said global directory said modified words written back from said source cache and concurrently storing in said global directory said old cache line from said memory; and (d) transferring from said global directory said modified cache line.

9. The method of claim 8, further including the step of identifying modified words by using a bit vector in a header.

10. The method of claim 8, further comprising the steps of determining at said global directory that data has been modified in said modified data line and determining the identity of said source cache.

11. The method of claim 8, further comprising the step of allocating a state line for each cache line of the system.

12. The method of claim 11, further comprising the step of specifying in said state line a particular cache line.

13. The method of claim 11, further comprising the step of specifying in said state line a global state.

14. The method of claim 11, further comprising the step of specifying in said state line one or more processors owning the cache line.

15. The method of claim 11, further comprising the step of providing a wait event indicator for indicating whether the state line is waiting for a write-back.

16. The method of claim 11, further comprising the step of providing a request event indicator for identifying the event which caused any write-back to occur.

17. The method of claim 8, further including the step of transferring said modified words simultaneously to both the memory and the global directory.

* * * * *